US011699202B2

(12) United States Patent
Vanzetta

(10) Patent No.: US 11,699,202 B2
(45) Date of Patent: Jul. 11, 2023

(54) METHOD AND SYSTEM TO FACILITATE GAMIFIED ARBITRATION OF SMART CONTRACTS

(71) Applicant: Robert Vanzetta, Washington, DC (US)

(72) Inventor: Robert Vanzetta, Washington, DC (US)

( * ) Notice: Subject to any disclaimer, the term of this patent is extended or adjusted under 35 U.S.C. 154(b) by 0 days.

(21) Appl. No.: 16/439,275

(22) Filed: Jun. 12, 2019

(65) Prior Publication Data

US 2019/0378227 A1    Dec. 12, 2019

Related U.S. Application Data

(60) Provisional application No. 62/683,981, filed on Jun. 12, 2018.

(51) Int. Cl.
  *G06Q 50/18* (2012.01)
  *G06Q 20/10* (2012.01)
  (Continued)

(52) U.S. Cl.
  CPC ......... *G06Q 50/182* (2013.01); *G06Q 20/108* (2013.01); *G06Q 20/383* (2013.01); *G06Q 20/405* (2013.01)

(58) Field of Classification Search
  USPC .......................................................... 705/309
  See application file for complete search history.

(56) References Cited

U.S. PATENT DOCUMENTS 9,792,459 B2    10/2017  Forsberg et al.
2002/0147604 A1 *  10/2002  Slate, II ............... G06Q 50/182
                                                    705/64

(Continued)

FOREIGN PATENT DOCUMENTS

WO    WO2018020373 A1    2/2018
WO    WO-2018170321 A1 *  9/2018 ............. G06F 15/76

OTHER PUBLICATIONS

Poblet, Marta, Sintelnet WG5 Workshop on Crowd Intelligence: Foundations, Methods and Practices, Jan. 8-9, 2014, European Network for Social Intelligence, pp. 95-106, (Year: 2014).*

(Continued)

*Primary Examiner* — Michael Young

(57) ABSTRACT

Disclosed herein is a system to facilitate gamified arbitration of smart contracts. Further, the system includes a communication device configured for receiving a smart contract data associated with a disputed smart contract from an external system, transmitting an arbitration request to a plurality of arbitrator devices to arbitrate the disputed smart contract, receiving an acceptance of the arbitration request from two or more arbitrator devices in the plurality of arbitrator devices, receiving an arbitration stake from the two or more arbitrator accounts associated with the two or more arbitrator devices, transmitting the smart contract data to the two or more arbitrator devices, and receiving an arbitration result from the two or more arbitrator devices, and a processing device configured for allocating the security deposit fund amongst the plurality of participants and the two or more arbitrators corresponding to the two or more arbitrator devices based on the arbitration result.

14 Claims, 9 Drawing Sheets

(51) Int. Cl.
 *G06Q 20/40* (2012.01)
 *G06Q 20/38* (2012.01)

(56) References Cited

U.S. PATENT DOCUMENTS

| | | | |
|---|---|---|---|
| 2009/0083192 A1* | 3/2009 | Bokor | G06Q 10/00 |
| | | | 705/80 |
| 2009/0170604 A1* | 7/2009 | Mueller | A63F 13/12 |
| | | | 463/42 |
| 2013/0304667 A1* | 11/2013 | Reisch | G06Q 30/0282 |
| | | | 705/347 |
| 2017/0091750 A1 | 3/2017 | Maim | |
| 2017/0337534 A1 | 11/2017 | Goeringer et al. | |
| 2018/0096175 A1 | 4/2018 | Schmeling et al. | |
| 2018/0268506 A1* | 9/2018 | Wodetzki | G06K 9/00456 |
| 2019/0180395 A1* | 6/2019 | Moretti | G06Q 50/182 |

OTHER PUBLICATIONS

Cass R. Sunstein, "Group Judgments: Statistical Means, Deliberation, and Information Markets," 80 New York University Law Review 962 (2005) (Year: 2005).*

Leroy, Michael, Are Arbitrators Above the Law? The "Manifest Disregard of the Law" Standard, Boston Law Reivew, vol. 52: 137 (2011) (Year: 2011).*

Jeremy Barnett, Philip Treleaven, Algorithmic Dispute Resolution—The Automation of Professional Dispute Resolution Using AI and Blockchain Technologies, The Computer Journal, vol. 61, Issue 3, Mar. 2018, pp. 399-408, (Year: 2018).*

* cited by examiner

METHOD AND SYSTEM TO FACILITATE GAMIFIED ARBITRATION OF SMART CONTRACTS

FIELD OF THE INVENTION

Generally, the present disclosure relates to smart contracts. More specifically, the present disclosure relates to a method and system to facilitate gamified arbitration of smart contracts.

BACKGROUND OF THE INVENTION

Smart contracts are computer protocols which digitally facilitate, verify, and/or enforce the negotiation or performance of a contract. Smart contracts involve one or more users who sign off the smart contract which may be executed right away or in the future. Nowadays, smart contracts are often utilized on decentralized systems, such as blockchains. Smart contracts can comprise many kinds of clauses which can be executed partially or together. Smart contracts allow for trusted and previously agreed transactions and agreements to be executed among disparate, anonymous parties without the need for a central authority, legal system, or external enforcement mechanism which allow for transactions and agreements to be traceable, transparent, and irreversible. Smart contracts provide many benefits which provide greater freedom to users, but smart contracts also provide many disadvantages. Due to the new technology involved in smart contracts, users involved in smart contracts are still suspicious of the smart contracts and other users due to the anonymity and complexity of the technology. Furthermore, users can find themselves unable to make changes or addendums to smart contracts without causing different complications or distrust between the involved parties. Third-party agents can be involved in smart contracts to help arbitrate smart contracts as well as different actions or processes involved with smart contracts. But, just like with the smart contract technology, users can be dubious of the third-party agents, their role in the smart contract arbitration, or their motives. There is a need for a better arbitration system which increases the trust of users involved in smart contracts.

Therefore, there is a need for improved methods and systems to facilitate gamified arbitration of smart contracts that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

A method to facilitate gamified arbitration of disputed smart contracts is disclosed. The method may include receiving, using a communication device, a smart contract data associated with a disputed smart contract from an external system. Preferably, the external system is a distributed ledger system. Further, the smart contract data may include at least one of an arbitration clause, information about a plurality of participants of the disputed smart contract and an associated security deposit data. Further, the associated security deposit data may include information about a plurality of security deposits received from the plurality of participants to create a security deposit fund. Further, the method may include transmitting, using the communication device, an arbitration request to a plurality of arbitrator devices to arbitrate the disputed smart contract. Further, the method may include receiving, using the communication device, an acceptance of the arbitration request from two or more arbitrator devices in the plurality of arbitrator devices. Further, the method may include receiving, using the communication device, an arbitration stake from the two or more arbitrator accounts associated with the two or more arbitrator devices. Further, the arbitration stake is added to the security deposit fund. Further, the method may include transmitting, using the communication device, the smart contract data to the two or more arbitrator devices. Further, the method may include receiving, using the communication device, an arbitration result from the two or more arbitrator devices. Further, the method may include allocating, using a processing device, a smart contract fund associated with the disputed smart contract amongst the plurality of participants based on the arbitration result. Further, the smart contract fund may include a value of the disputed smart contract. Further, the method may include allocating, using the processing device, the security deposit fund amongst the plurality of participants and the two or more arbitrator accounts corresponding to the two or more arbitrator devices based on the arbitration result.

Disclosed herein is a system to facilitate gamified arbitration of smart contracts. Further, the system includes a communication device configured for receiving a smart contract data associated with a disputed smart contract from a distributed ledger system, transmitting an arbitration request to a plurality of arbitrator devices to arbitrate the disputed smart contract, receiving an acceptance of the arbitration request from two or more arbitrator devices in the plurality of arbitrator devices, receiving an arbitration stake from the two or more arbitrator accounts associated with the two or more arbitrator devices, transmitting the smart contract data to the two or more arbitrator devices, and receiving an arbitration result from the two or more arbitrator devices, and a processing device configured for allocating the security deposit fund amongst the plurality of participants and the two or more arbitrators corresponding to the two or more arbitrator devices based on the arbitration result.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
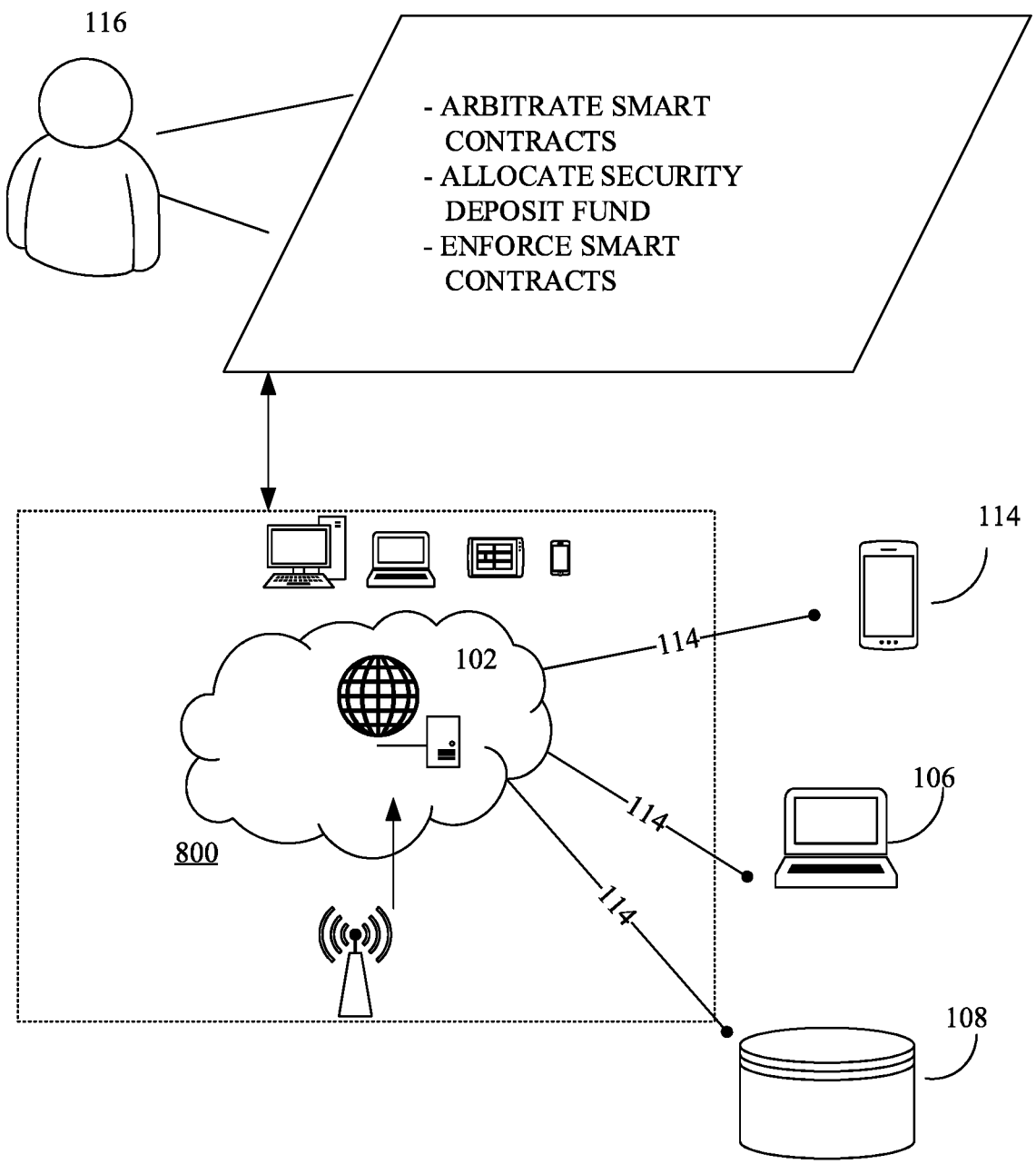
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of gamified arbitration of smart contracts, embodiments of the present disclosure are not limited to use only in this context.

In general, the methods disclosed herein may be performed by one or more computing devices. For example, in some embodiments, the methods may be performed by a server computer in communication with one or more client devices over a communication network such as, for example, the Internet. In some other embodiments, the methods may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a supercomputer, a mainframe computer, mini-computer, microcomputer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the methods disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the methods may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the methods may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the methods. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the methods may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the methods. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the methods. Accordingly, the one or more predefined conditions may be generated, using the processing device, based on the correlation.

Further, one or more steps of the methods may be performed at one or more spatial locations. For instance, the methods may be performed by a plurality of devices interconnected through a communication network. Accordingly, in an example, one or more steps of the methods may be performed by a server computer. Similarly, one or more steps of the methods may be performed by a client computer. Likewise, one or more steps of the methods may be performed by an intermediate entity such as, for example, a proxy server. For instance, one or more steps of the methods may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the methods. For example, in a client-server environment, sensitive data corresponding to a user may not be allowed to be transmitted to the server computer. Accordingly, one or more steps of the methods operating on the sensitive data and/or a derivative thereof may be performed at the client device.

FIG. 1 is an illustration of an online platform 100 consistent with various embodiments of the present disclosure. By way of non-limiting example, the online platform 100 to facilitate gamified arbitration of smart contracts may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), and databases 108 over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the online platform 100.

A user 116, such as the one or more relevant parties, may access online platform 100 through a web based software application or browser. The web based software application may be embodied as, for example, but not be limited to, a website, a web application, a desktop application, and a mobile application compatible with a computing device 800.

Figure 2:
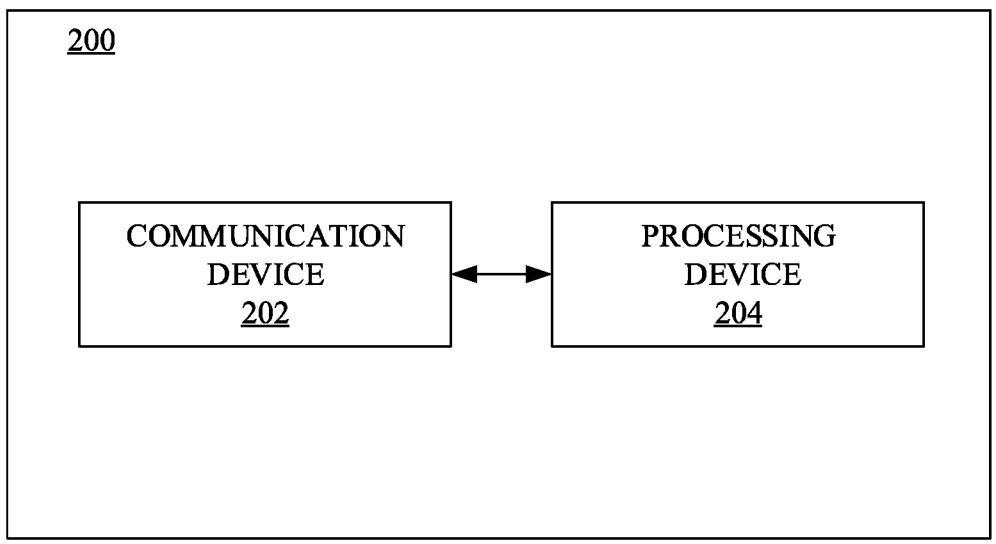
FIG. 2 is a block diagram of a system to facilitate gamified arbitration of smart contracts, in accordance with some embodiments.

FIG. 2 is a block diagram of a system 200 to facilitate gamified arbitration of smart contracts, in accordance with some embodiments. Further, a smart contract may include a computer protocol and code intended to digitally facilitate, verify, or enforce negotiation or performance of a contract. Further, a smart contract may include a self-executing contract with one or more terms of the smart contract between one or more participants directly written into lines of code. Further, the code and one or more terms and agreements contained therein may exist across a decentralized and distributed ledger system, such as a block-chain, a block directed acyclic graph (blockDAG), or a transaction-based directed acyclic graphs (TDAG).

Further, the system 200 may include a communication device 202. Further, the communication device 202 may be configured for receiving a smart contract data associated with a disputed smart contract from the distributed ledger system. Further, the smart contract data may include at least one of an arbitration clause, information about a plurality of participants of the disputed smart contract and an associated security deposit data. Further, the arbitration clause may include a requirement to initiate arbitration upon raising of a dispute by at least one participant in the plurality of participants of the smart contract. For instance, the dispute may be raised by the at least one participant in the plurality of participants if one or more participants of the plurality of participants may have not fulfilled one or more agreements set in the smart contract.

Further, in some embodiments, the smart contract data may include at least one of a contract data and a dispute data. Further, the contract data may include one or more terms of the smart contract, and identification data related to the one or more participants. Further, the one or more terms may be associated with the plurality of participants. For instance, the smart contract data may include a rent agreement between a renter, and a homeowner. Further, the one or more terms may dictate that the renter may need to pay an amount of rent specified in the smart contract to the homeowner at a preset interval as specified in the smart contract. For instance, the renter may need to pay $500 as rent every month to the homeowner every month in the first week of the month. Further, a term of the smart contract may specify that the homeowner may need to transmit a digital access key, such as a QR code, or a password for a rented home to the renter. Further, identification details of the renter and the homeowner may include a name, an address, a date of birth, a social security number, and so on of the renter and the homeowner.

Further, the dispute data may include one or more unenforced terms of the disputed smart contract by one or more participants of the plurality of participants. For instance, one or more unenforced terms of the disputed rent agreement may include that the renter may not have paid the rent on time. Further, in an instance, the one or more unenforced terms of the disputed rent agreement may include that the homeowner may have transmitted an expired digital access key to the renter.

Further, the associated security deposit data may include information about a plurality of security deposits received from the plurality of participants to create a security deposit fund. For instance, the plurality of security deposits may be of an equal amount. Further, in an embodiment, the plurality of security deposits may be of different amounts, as specified in the contract data.

Further, the communication device 202 may be configured for transmitting an arbitration request to a plurality of arbitrator devices to arbitrate the disputed smart contract. Further, the arbitration request may include an indication of a type of smart contract, such as a rent agreement, a non-disclosure agreement, a purchase agreement, a land deed, and so on.

Further, the communication device 202 may be configured for receiving an acceptance of the arbitration request from two or more arbitrator devices in the plurality of arbitrator devices. For instance, a rejection of the arbitration request may be received from one or more arbitrator devices in the plurality of arbitrator devices. Further, in an instance, an acceptance of the arbitration request may be received from the plurality of arbitrator devices.

Further, the communication device 202 may be configured for receiving an arbitration stake from the two or more arbitrator accounts associated with the two or more arbitrator devices. Further, the arbitration stake may be added to the security deposit fund. Further, in an instance, the arbitration stake may be received from at least one of a bank account, a digital wallet, and a cryptocurrency wallet associated with each of the two or more arbitrator devices. Further, the arbitration strake may be received from the two or more arbitrator accounts in the form of cryptocurrency, real currency, or a combination of cryptocurrency and real currency.

Further, the communication device 202 may be configured for transmitting the smart contract data to the two or more arbitrator devices. Further, smart contract data, including the contract data, including the one or more terms of the disputed smart contract, and the one or more unenforced terms of the disputed smart contract may be transmitted to the plurality or arbitrator devices.

Further, the communication device 202 may be configured for receiving an arbitration result from the two or more arbitrator devices. Further, the arbitrator result may include an indication of one or more guilty participants in the plurality of participants, and one or more grieved participants in the plurality of participants. For instance, the one or more guilty participants may include participants who may not have enforced one or more terms of the disputed smart contract. For instance, if the disputed smart contract includes a service agreement between one or more vendors and a customer, the one or more vendors may be adjudged to be guilty participants due to not enforcing one or more terms of the disputed smart contract related to providing service to the customer. Further, the customer may be adjudged to be the grieved party. Further, in an instance, the result may include an indication of a percentage of the smart contract fund that each of the plurality of participants may receive.

Further, the system 200 may include a processing device 204 configured for allocating a smart contract fund associated with the disputed smart contract amongst the plurality of participants based on the arbitration result. Further, the smart contract fund may include value of the disputed smart contract. For instance, the disputed smart contract may include an agreement between a construction enterprise, and an individual to construct a house. Further, the smart contract may include an amount of $100000 that may be payable to the construction enterprise by the individual upon construction of the house. Accordingly, the smart contract fund of $100000 may be allocated amongst the plurality of participants based on the arbitration result. For instance, one or more guilty participants may receive a reduced percentage of the smart contract fund as a penalty. For instance, if the construction enterprise is determined to be a guilty participant based on one or more unfulfilled terms of the disputed smart contract, the construction enterprise may receive a reduced percentage of the smart contract fund as a penalty. Further, one or more grieved participants may be allocated an increased percentage of the security deposit fund as compensation.

Further, the processing device 204 may be configured for allocating the security deposit fund amongst the two or more arbitrators corresponding to the two or more arbitrator devices based on the arbitration result. Further, a percentage of the security deposit fund may be allocated to the two or more arbitrators as a service composition. Further, the amount of security deposit fund allocated to the two or more arbitrator accounts may be determined based on an accuracy of arbitration provided by the two or more arbitrators. For instance, based on the analyzing of the arbitration result, if an arbitrator in the two or more arbitrators is determined to not have followed a predetermined set of rules for arbitration, the arbitrator may not receive an allocation from the security deposit fund.

Further, in some embodiments, each participant in the plurality of participants may contribute a predetermined amount to the security deposit fund at the time of institution of the smart contract. Further, in an instance, each participant in the plurality of participants may contribute the predetermined amount to the security deposit fund at the time of raising the dispute. Further, in an instance, the predetermined amount of security deposit may vary. For instance, if the disputed smart contract includes two participants in an agreement with each other, each of the two participants may contribute an equal predetermined amount. Further, in an instance, if the disputed smart contract includes a prime participant in a contract with a plurality of sub-participants, the prime participant may need to make an amount of security deposit equal to a combined security deposit of the plurality of sub-participants.

Further, in some embodiments, the smart contract data may include a predetermined number of the arbitrators required to arbitrate the disputed smart contract. Further, the acceptance of the arbitration request may be received from the two or more arbitrator devices based on the predetermined number of the arbitrators. For instance, based on one or more terms in the disputed smart contract, the acceptance of the may be received from seven arbitrator devices on a first-come basis. Further, in an instance, the arbitration request may be transmitted to a plurality of arbitrator devices based on one or more terms, or the arbitration clause in the disputed smart contract. For instance, based on one or more terms in the disputed smart contract, the transmitting may include sending the arbitration request to five arbitrator devices. Further, in an instance, the smart contract data may not include the predetermined number of arbitrators required to arbitrate the disputed smart contract. Accordingly, the transmitting may include sending the arbitration request to a plurality of random arbitrator devices.

Further, in some embodiments, the communication 202 device may be configured for receiving one or more documents from the plurality of participants as evidence for proving fulfillment of one or more terms of the disputed smart contract. For instance, if the disputed smart contract includes an agreement between a construction company and an individual for construction of a house, and one or more unenforced terms of the disputed smart contract indicate that the construction company may not have used a particular type of wood to construct the roof of the house, the one or more documents may be received from the construction company. Further, the one or more documents include purchase receipts detailing the purchase of the particular type of wood, and a signed document including signatures of the individual indicating acceptance of the use of the particular type of wood for constructing the roof from the construction company.

Further, in some embodiments, the processing device 204 may be configured for anonymizing the smart contract data to generate an anonymized smart contract data. Further, the communication device 202 may be configured for transmitting the anonymized smart contract data to the two or more arbitrator devices. Further, the anonymizing may include removing identification details from the smart contract data, such as names, ages, contact details, social security numbers, and so on of the plurality of participants to generate the anonymized smart contract data. Further, the anonymized smart contract data may be generated to maintain the privacy of the plurality of participants.

Further, in some embodiments, the communication device 202 may be configured for transmitting at least one rule to the two or more arbitrator devices for arbitration of the disputed smart contract. Further, the at least one rule may include a set of guidelines that the two or more arbitrators may need to follow while performing arbitration of the disputed smart contract. For instance, the at least one rule may include that if a participant is determined to have violated a law of a country that the participant may be a resident of, the arbitrator may need to recommend that the participant may be allocated zero percent of the smart contract fund as a penalization. For instance, if a participant is a resident of the United States of America, and the disputed smart contract includes an employment contract between an employer and an employee and one or more unenforced terms include labor laws, the employer may receive 0 percent of the smart contract fund. Further, in an embodiment, the at least one rule may include one or more government policies. Further, the at least one rule may be retrieved from one or more databases, such as government databases.

Further, in an instance, the at least one rule may include that each arbitrator in the plurality of arbitrators may allocated zero percent of the smart contract fund to one or more participants in the plurality of participants of the one or more participants are determined to have attempted to contact the plurality of arbitrators for collusion.

Further, in some embodiments, the at least one rule may include that the plurality of arbitrators may allocate zero percent of the smart contract fund to the plurality of participants if the disputed smart contract relates to one or more illegal activities. For instance, if the disputed smart contract is related to selling of illegal drugs, the plurality of arbitrators may allocate zero percent of the smart contract fund to the plurality of participants.

Further, in some embodiments, the processing device 204 may be configured for analyzing the arbitration result. Further, the processing device 204 may be configured for assigning a rating to each of the two or more arbitrators corresponding to the two or more arbitrator devices based on the analyzing of the arbitration result. For instance, the arbitration result may be analyzed to determine if the two or more arbitrators may have followed one or more arbitration rules. Further, each arbitrator in the two or more arbitrators may be assigned a rating proportional to a number of rules that each arbitrator may have followed.

Further, the communication device 202 may be configured for transmitting the assigned rating to each of the two or more arbitrator devices.

Further, the arbitration result may include a percentage share of the security deposit corresponding to the plurality of participants. For instance, if the disputed smart contract includes a service agreement between one or more vendors and a customer, the one or more vendors may be adjudged to be guilty participants due to not enforcing one or more terms of the disputed smart contract related to providing service to the customer. Further, the customer may be adjudged to be the grieved party. Further, the result may include an indication of a percentage of the smart contract fund that each of the plurality of participants may receive. For instance, one or more guilty participants may receive a reduced percentage of the smart contract fund as a penalty.

Further, one or more grieved participants may be allocated an increased percentage of the smart contract fund as compensation.

Further, the allocating may include distributing the smart contract fund amongst the plurality of participants based on an average of the percentage share of the security deposit as assigned by the two or more arbitrators. For instance, if three arbitrators allocate a percentage of 20 percent, 30 percent, and 40 percent of the smart contract fund to a participant in the plurality of participants, 30 percent of the smart contract fund may be allocated to the participant.

Further, in some embodiments, the processing device 204 may be configured for evaluating the arbitration result to determine collusion between the two or more arbitrators. For instance, collusion may be determined the two or more arbitrators if the arbitration result received from the two or more arbitrators is within a predetermined range. For instance, if the arbitration result received from the two or more arbitrators specifies an equal share of the smart contract fund, the two or more arbitrators may be determined to be colluding.

Further, in some embodiments, the processing device 204 may be configured for imposing a penalty on the two or more colluding arbitrators based on the evaluating. For instance, the penalty may include banning the two or more colluding arbitrators. Further, the two or more colluding arbitrators may not be transmitted arbitration request after banning. Further, in an instance, the penalty may include assigning negative ratings to the two or more colluding arbitrators. Further, in an instance, the penalty may include not allocating a percentage of the security deposit fund to the two or more colluding arbitrators. Further, in an instance, the penalty may include imposing a fine on the two or more colluding arbitrators.

Further, in some embodiments, the processing device 204 may be configured for inspecting the smart contract data. Further, the processing device 204 may be configured for determining the plurality of arbitrators from predetermined tiers of arbitrators based on the inspecting. For instance, the analyzing may include determining a value of the disputed smart contract, and a value of the deposited security fund. Further, the predetermined tiers of arbitrators may be based on a value of the disputed smart contract and a value of the deposited security fund. For instance, a first tier may include predetermined arbitrators to arbitrate disputed smart contracts below a value of $100, a second tier may include predetermined arbitrators to arbitrate disputed smart contracts below a value of $1000, and a third tier may include predetermined arbitrators to arbitrate disputed smart contracts below a value of $10000. Accordingly, the plurality of arbitrators may be determined from the predetermined tiers based on the value of the disputed smart contract, and a security deposit fund associated with thereof. For instance, if the disputed smart contract includes a security deposit fund of $600, the plurality of arbitrators may be chosen from the second tier.

Figure 3:
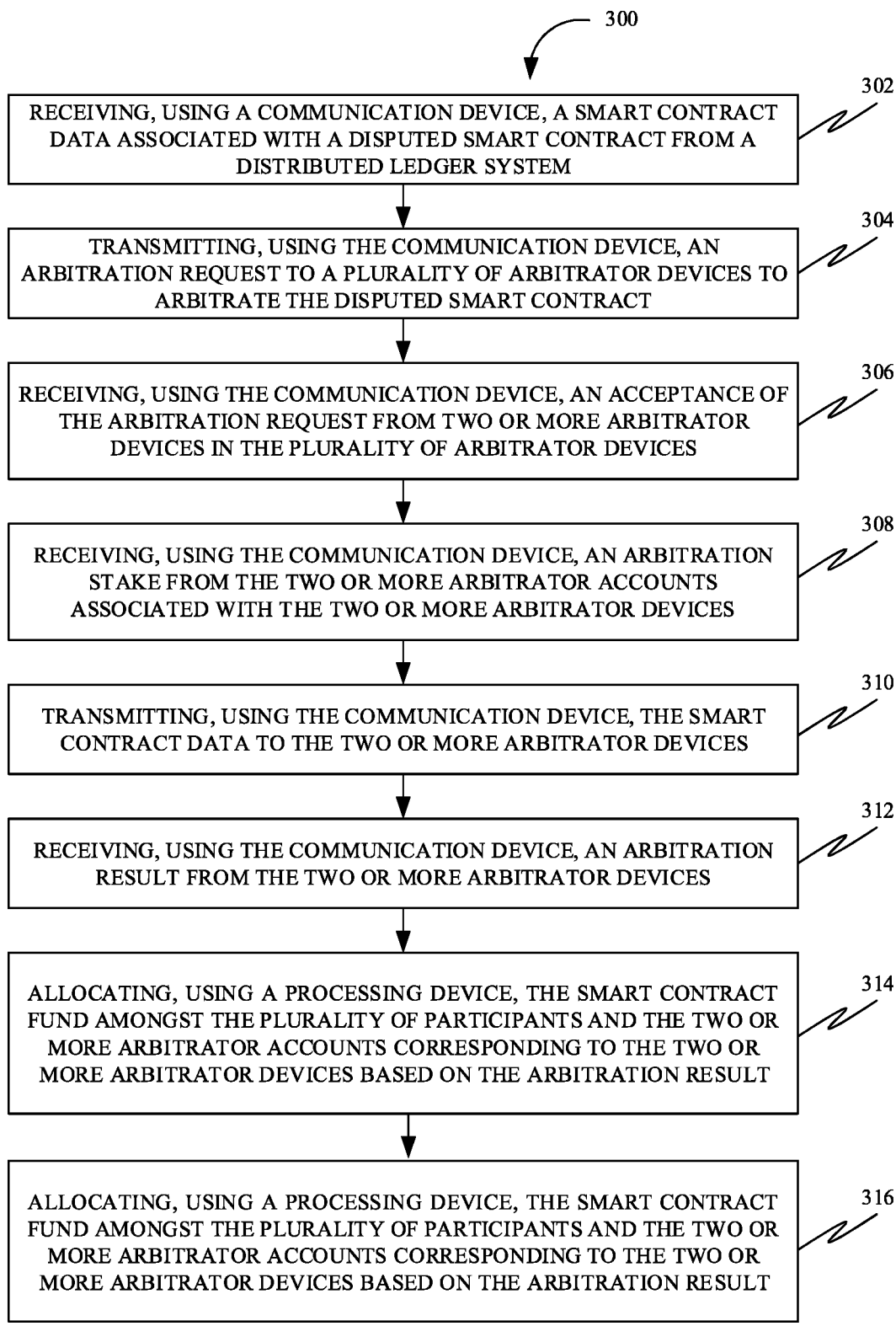
FIG. 3 is a flowchart of a method to facilitate gamified arbitration of smart contracts, in accordance with some embodiments.

FIG. 3 is a flowchart of a method 300 to facilitate gamified arbitration of smart contracts, in accordance with some embodiments. Further, at 302, the method 300 may include receiving, using a communication device, a smart contract data associated with a disputed smart contract from an external system. Preferably, the external system is a distributed ledger system. Further, the smart contract data may include information about a plurality of participants of the disputed smart contract and an associated security deposit data. Further, the associated security deposit data may include information about a plurality of security deposits received from the plurality of participants to create a security deposit fund.

Further, at 304, the method 300 may include transmitting, using the communication device, an arbitration request to a plurality of arbitrator devices to arbitrate the disputed smart contract.

Further, at 306, the method 300 may include receiving, using the communication device, an acceptance of the arbitration request from two or more arbitrator devices in the plurality of arbitrator devices.

Further, at 308, the method 300 may include receiving, using the communication device, an arbitration stake from the two or more arbitrator accounts associated with the two or more arbitrator devices. Further, the arbitration stake may be added to the security deposit fund.

Further, at 310, the method 300 may include transmitting, using the communication device, the smart contract data to the two or more arbitrator devices.

Further, at 312, the method 300 receiving, using the communication device, an arbitration result from the two or more arbitrator devices.

Further, at 314, the method 300 allocating, using a processing device, a smart contract fund amongst the plurality of participants based on the arbitration result.

Further, at 316, the method 300 allocating, using the processing device, the security deposit fund amongst the two or more arbitrator devices based on the arbitration result.

Further, in some embodiments, the smart contract data may include at least one of a contract data and a dispute data. Further, the contract data may include one or more terms of the disputed smart contract, identification data related to the one or more participants. Further, the dispute data may include one or more unenforced terms of the disputed smart contract by one or more participants of the plurality of participants.

Further, in some embodiments, each participant in the plurality of participants may contribute a predetermined amount to the security deposit fund at the time of institution of the smart contract.

Further, in some embodiments, the smart contract data may include a predetermined number of the arbitrators required to arbitrate the disputed smart contract. Further, the transmitting may include sending the arbitration request to a plurality of arbitrator devices based on the predetermined number of the arbitrators.

Further, in some embodiments, the method 300 may include transmitting, using the communication device, at least one rule to the two or more arbitrator devices for arbitration of the disputed smart contract.

Further, in some embodiments, the arbitration result may include a percentage share of the security deposit corresponding to the plurality of participants. Further, the allocating may include distributing the smart contract fund amongst the plurality of participants based on an average of the percentage share of the security deposit as assigned by the two or more arbitrators.

Figure 9:
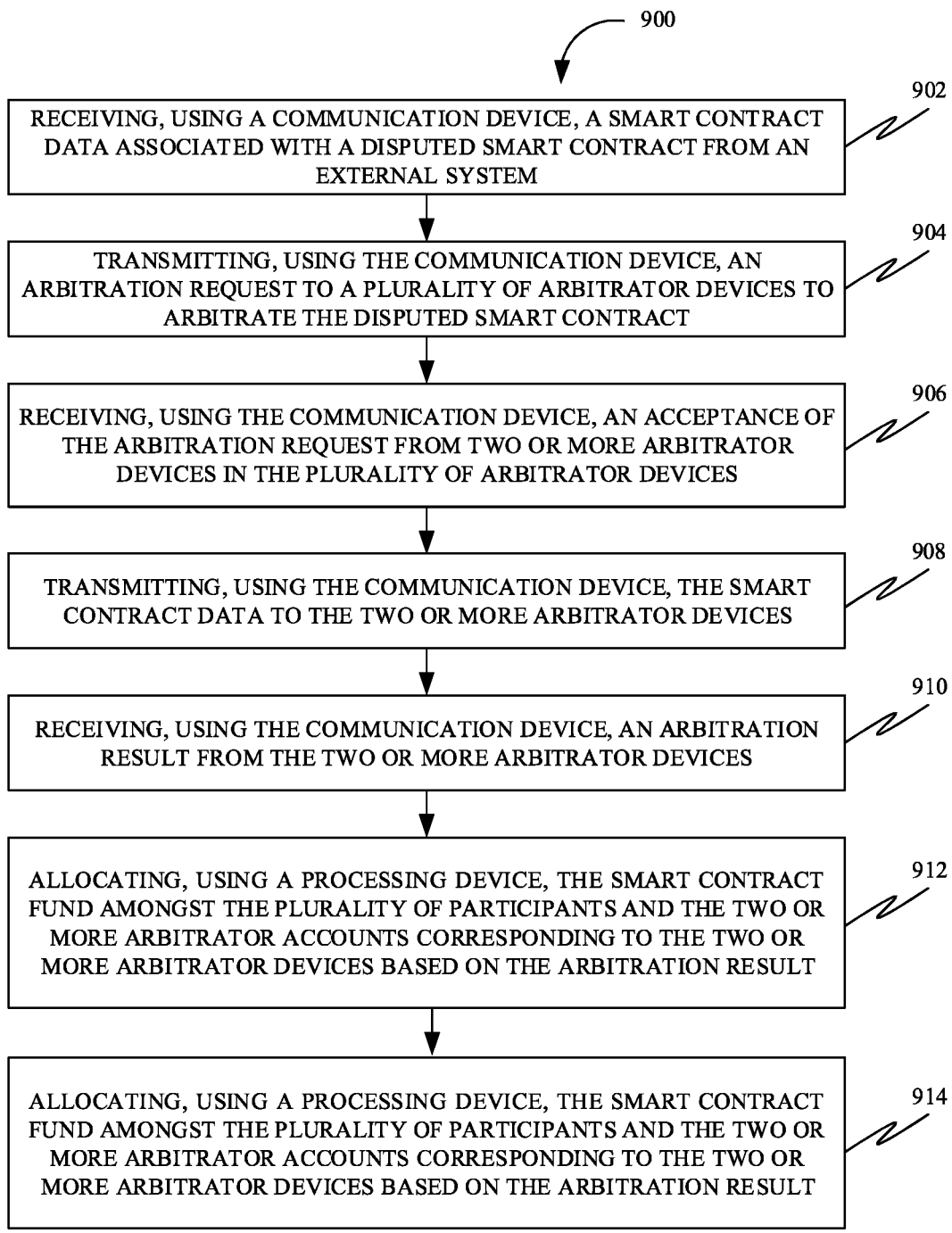
FIG. 9 is a flowchart of a method to facilitate gamified arbitration of smart contracts, in accordance with some embodiments.

FIG. 9 shows a more streamlined version of the flowchart shown in FIG. 3.

Figure 4:
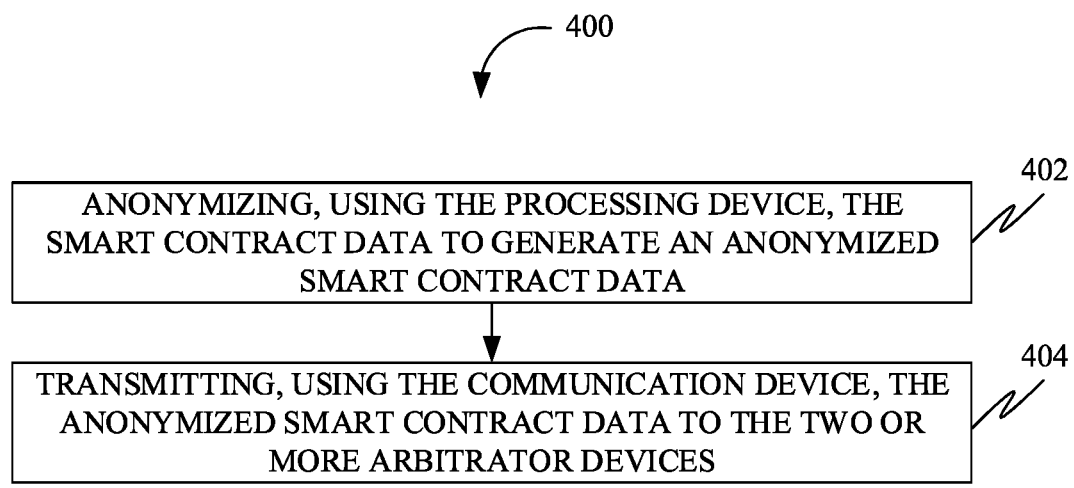
FIG. 4 is a flowchart of a method of anonymizing the smart contract data in accordance with some embodiments.

FIG. 4 is a flowchart of a method 400 of anonymizing the smart contract data in accordance with some embodiments. Further, at 402, the method 400 may include anonymizing, using the processing device, the smart contract data to generate an anonymized smart contract data.

Further, at 404, the method 400 may include transmitting, using the communication device, the anonymized smart contract data to the two or more arbitrator devices.

Figure 5:
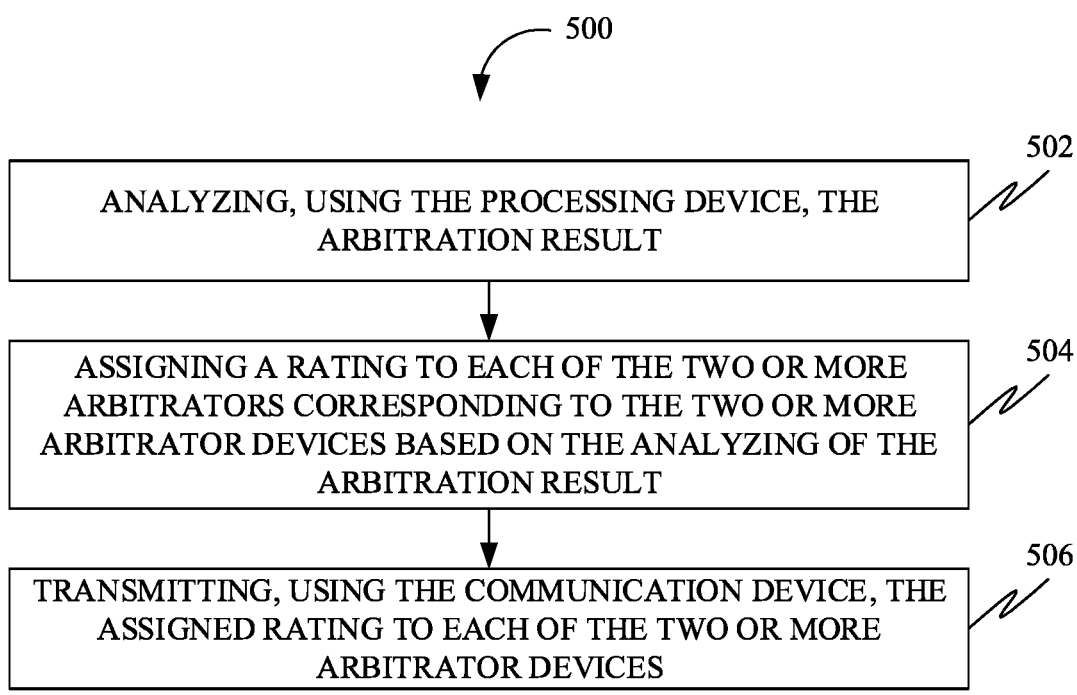
FIG. 5 is a flowchart of a method of assigning a rating to the two or more arbitrators in accordance with some embodiments.

FIG. 5 is a flowchart of a method 500 of assigning a rating to the two or more arbitrators in accordance with some embodiments.

Further, at 502, the method 500 may include analyzing, using the processing device, the arbitration result.

Further, at 504, the method 500 may include assigning a rating to each of the two or more arbitrators corresponding to the two or more arbitrator devices based on the analyzing of the arbitration result.

Further, at 506, the method 500 may include transmitting, using the communication device, the assigned rating to each of the two or more arbitrator devices.

Figure 6:
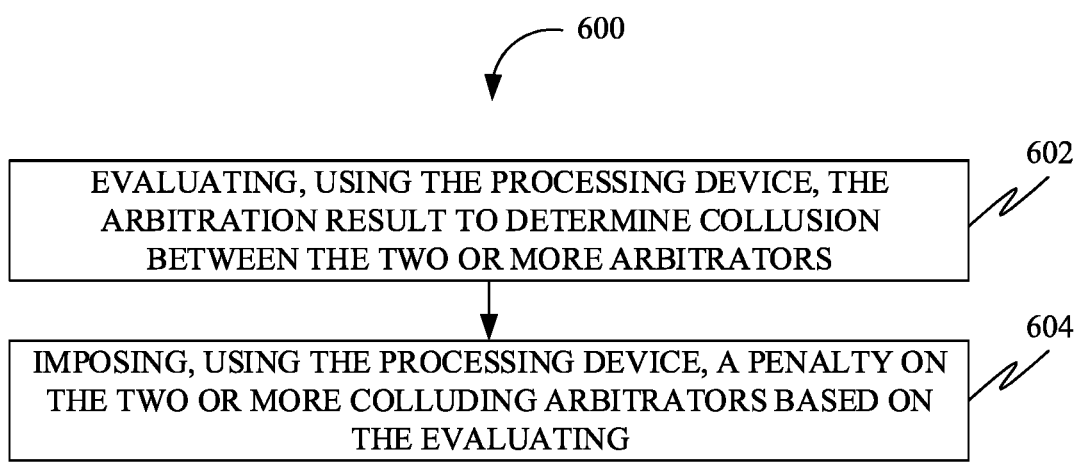
FIG. 6 is a flowchart of a method for determining collusion between the two or more arbitrators, in accordance with some embodiments.

FIG. 6 is a flowchart of a method 600 for determining collusion between the two or more arbitrators, in accordance with some embodiments.

Further, at 602, the method 600 may include evaluating, using the processing device, the arbitration result to determine collusion between the two or more arbitrators.

Further, at 604, the method 600 may include imposing, using the processing device, a penalty on the two or more colluding arbitrators based on the evaluating.

Figure 7:
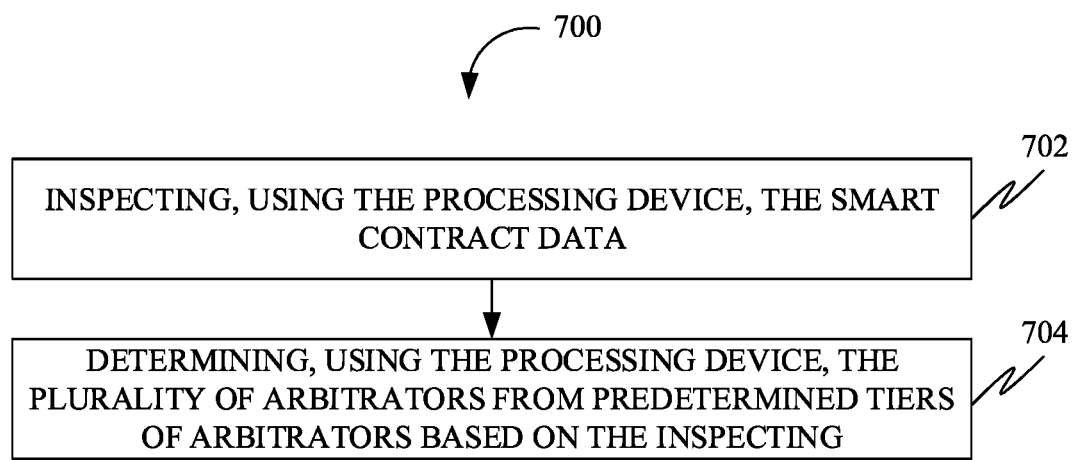
FIG. 7 is a flowchart of a method of determining the plurality of arbitrators from a plurality of predetermined tiers, in accordance with some embodiments.

FIG. 7 is a flowchart of a method 700 of determining the plurality of arbitrators from a plurality of predetermined tiers, in accordance with some embodiments.

Further, at 702, the method 700 may include inspecting, using the processing device, the smart contract data.

Further, at 704, the method 700 may include determining, using the processing device, the plurality of arbitrators from predetermined tiers of arbitrators based on the inspecting.

Further, according to some embodiments, a gamified arbitration system for smart contracts to address the shortcomings of currently available smart contracts is disclosed. The gamified arbitration system can be provided along with a smart contract as a clause to create trust among all participants for all flexible smart contracts. The gamified arbitration system provides a system which promotes trust between users as well as with arbitrators by implementing an automated system which enforces fair arbitration and forces users to follow the smart contracts' clauses. The gamified arbitration system provides a number of arbitrators which can arbitrate the actions, transactions, or agreements involved in smart contracts after previously agreed conditions are met during the execution of the smart contracts. The gamified arbitration system further provides a fund system managed by the smart contracts' automated decentralized system which can be distributed to users or arbitrators as a form of payment or reward. The gamified arbitration system provides a system which promotes trust between users as well as with arbitrators by implementing an automated system which enforces fair arbitration and forces users to follow the smart contracts' clauses.

Further, a Gamified Arbitration System (GAS) is disclosed. In an embodiment, the gamified arbitration system is a computer protocol implemented by a computing decentralized system for smart clauses. The gamified arbitration system can be installed and/or accessed through a computing device in the form of a software application. The gamified arbitration system can also be accessed through a third-party application such as a search engine or website. The smart contract and decentralized system can be provided by a third-party provider but can also be provided with the gamified arbitration system. In a preferred embodiment of the present disclosure, the gamified arbitration system is a system provided with a smart contract as part of a smart contract clause. The gamified arbitration system provides the GAS clause which is provided in the smart contract for the plurality of users to read and agree. The GAS clause sets the security deposit format and number of arbitrators which would be involved in the arbitration of a smart contract. In an embodiment, the security deposit is a fee paid by the involved plurality of users in a smart contract. The security fees can be a variable percentage or a flat fee depending on the flexible smart contract. The security fees are put together into a GAS fund. In an embodiment, the GAS fund of the gamified arbitration system is not controlled by no single entity and is only controlled by a decentralized flexible smart contract system. The GAS fund of the gamified arbitration system is only accessed when arbitration is required, and the GAS funds are returned to the plurality of users in full if arbitration is not used. The GAS funds are separate from the funds/assets involved in a smart contract. The funds/assets involved in the smart contract are preferably controlled by the underlying smart contract and the decentralized system enforcing the smart contract, but developers or plurality of users involved in the smart contract can change or alter the management of the funds/assets. If a user of the plurality of users involved in a smart contract believes the smart contract was not completed correctly as agreed by all involved plurality of users, the gamified arbitration system is enforced.

In an embodiment, the gamified arbitration system provides arbitration when at least one user of a plurality of users involved in a smart contract requests arbitration. When the gamified arbitration system is required, the GAS funds are accessed by the gamified arbitration system and combined with the plurality of arbitrators' stakes. In an embodiment, the stakes of the plurality of arbitrators are pre-specified amounts set by the GAS clause and are required to be added to the GAS funds from the plurality of arbitrators. The stakes of the plurality of arbitrators can be a variable percentage of the smart contract but preferably are flat fees. In some embodiments of the present disclosure, the stakes of the plurality of arbitrators can be determined by a tier system to reduce possible collusion and increase trust from the plurality of users involved in a smart contract. The stakes tier system for the plurality of arbitrators can be divided according to the amount of funds/assets involved in the smart contracts. In alternate embodiments of the present disclosure, the stakes tier system can be modified or structured according to different variables. Similarly, the number of the plurality of arbitrators involved in the arbitration of a smart contract is preset and agreed upon by the involved plurality of users when signing the GAS clause. The number of the plurality of arbitrators can depend according to the type of arbitration appropriate to the smart contract. For example, an even number of the plurality of arbitrators can be required in an all or nothing voting situation or when an average of each plurality of arbitrator's percentage voted for a percentage release of the original smart contract funds/assets. In an embodiment, the plurality of arbitrators is kept anonymous just like the plurality of users involved in the smart contract. Auto-generated pseudonyms can be used for communication between the involved parties. Furthermore, the plurality of arbitrators of the gamified arbitration system must undergo training on the specific GAS clauses involved in a smart contract. Notes on specific GAS clauses must be provided before every arbitration, such as fully downvote any flexible smart contract participant involved in collusion or fully downvote anyone selling anything illegal in the location(s) where the smart contract will be enforced. The GAS clause rules promote resolution of any issues regarding a smart contract between the plurality of users involved in the smart contract without the need of arbitration provided by the gamified arbitration system.

In an embodiment, when arbitration is required for a smart contract, all information, defenses, messages, and other relevant information from the smart contract and involved plurality of users is released to the plurality of arbitrators except for any personal information of the plurality of users. The information released to the plurality of arbitrators will depend on the GAS clause and flexible smart contract. The plurality of users involved in the smart contract will be given time to state their case to the plurality of arbitrators before arbitration commences. Additional information can be provided to the plurality of arbitrators in the form of documents or official statements. Communications between the plurality of users involved in the smart contract can also be released to the plurality of arbitrators. After arbitration begins, the plurality of arbitrators can review the case. After reviewing the case, the plurality of arbitrators must vote on how much percentage of the flexible smart contract funds/assets is owed to each plurality of users involved in the smart contract. The closer each arbitrator is to the average vote by the group plurality of arbitrators, the more percentage of the GAS funds and stakes pool each arbitrator earns. In an embodiment, the percentage can be dependent on a set formula or modified formula for a specific smart clause. After the arbitration has been finalized and the decision enforced, the plurality of arbitrators is rewarded from the GAS funds and stakes pool. In an embodiment, the gamified arbitration system comprises a payout structure which manages the pooled GAS funds and stakes. The payout structure of the gamified arbitration system comprises a formula which rewards and/or penalizes the plurality of arbitrators based on performance which is specified in the GAS clause and will depend on the flexible smart contract that is arbitrated. The payout structure is designed to block bots and discourage collusion. Additional security features can be implemented to prevent bots or collusion between the plurality of arbitrators during arbitration. The payout system of the gamified arbitration system leads to good arbitrators since bad arbitrators will lose money and good arbitrators will profit. The payout system of the gamified arbitration system leads to fair arbitration as each arbitrator of the plurality of arbitrators will vote according to their best assessment of the situation of the arbitrated smart contract and will be rewarded or penalized according to the GAS clause. The gamified arbitration system further comprises a performance review system. The gamified arbitration system may automatically rate the plurality of users involved in the smart contract as well as the plurality of arbitrators depending on the GAS clause and the smart contract arbitrated. Depending on the flexible smart contract and GAS clause, all involved parties may or may not be rated depending on how the transaction went. For example, if a seller on a smart contract did not deliver the product the seller specified, and the plurality of arbitrators voted that the seller will lose the payment for the product, the gamified arbitration system could be given a rating of zero out of five by the performance review system. In alternate embodiments of the present disclosure, the payout system and performance review system may be structured to weigh-in additional variables in order to promote fairer arbitration and better rewarding/penalization of the plurality of arbitrators.

Figure 8:
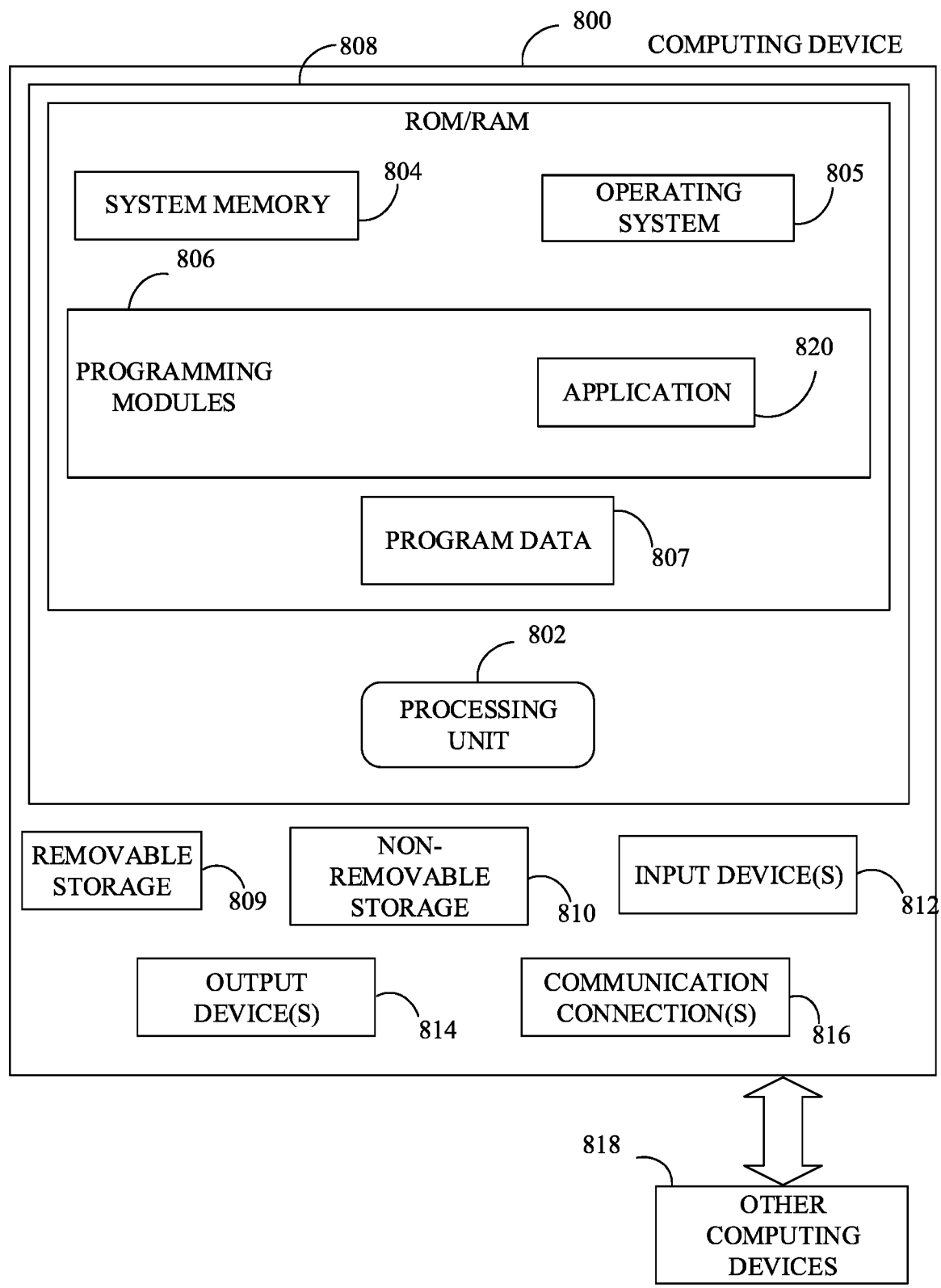
FIG. 8 is a block diagram of a computing device for implementing the methods disclosed herein, in accordance with some embodiments.

With reference to FIG. 8, a system consistent with an embodiment of the disclosure may include a computing device or cloud service, such as computing device 800. In a basic configuration, computing device 800 may include at least one processing unit 802 and a system memory 804. Depending on the configuration and type of computing device, system memory 804 may comprise, but is not limited to, volatile (e.g. random-access memory (RAM)), non-volatile (e.g. read-only memory (ROM)), flash memory, or any combination. System memory 804 may include operating system 805, one or more programming modules 806, and may include a program data 807. Operating system 805, for example, may be suitable for controlling computing device 800's operation. In one embodiment, programming modules 806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and non-volatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, a location sensor, a camera, a biometric sensor, etc. Output device(s) 814 such as a display, speakers, a printer, etc. may also be included. The aforementioned devices are examples and others may be used.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 804, including operating system 805. While executing on processing unit 802, programming modules 806 (e.g., application 820 such as a media player) may perform processes including, for example, one or more stages of methods, algorithms, systems, applications, servers, databases as described above. The aforementioned process is an example, and processing unit 802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method to facilitate gamified arbitration of disputed smart contracts, the method comprising:
    receiving, using a communication device, a smart contract data associated with a disputed smart contract from a distributed ledger system, wherein the smart contract data comprises at least one of an arbitration clause and information about a plurality of participants of the disputed smart contract and an associated security deposit data, and the associated security deposit data comprises information about a plurality of security deposits received from the plurality of participants to create a security deposit fund;
    transmitting, using the communication device, an arbitration request to a plurality of arbitrator devices to arbitrate the disputed smart contract;
    receiving, using the communication device, an acceptance of the arbitration request from at least two arbitrator devices in the plurality of arbitrator devices;
    receiving, using the communication device, an arbitration stake from at least two arbitrator accounts associated with the at least two arbitrator devices, wherein the arbitration stake is added to the security deposit fund;
    anonymizing, using a processing device, the smart contract data to generate an anonymized smart contract data by removing identification details from the smart contract data;
    transmitting, using the communication device, the anonymized smart contract data to the at least two arbitrator devices;
    receiving, using the communication device, an arbitration result from the at least two arbitrator devices;
    allocating, using the processing device, a smart contract fund associated with the disputed smart contract amongst the plurality of participants based on the arbitration result, wherein the smart contract fund comprises a value of the disputed smart contract;
    allocating, using the processing device, the security deposit fund amongst the at least two arbitrator accounts in a plurality of arbitrator accounts corresponding to the at least two arbitrator devices based on the arbitration result; and
    transmitting, using the communication device, at least one rule to the at least two arbitrator devices for arbitration of the disputed smart contract;
    analyzing, using the processing device, the arbitration result;
    assigning, using the communication device, a rating to each of the at least two arbitrator accounts corresponding to the at least two arbitrator devices based on the analyzing of the arbitration result; and
    transmitting, using the communication device, the assigned rating to each of the at least two arbitrator devices;
    wherein the at least one rule comprises:
        a government policy retrieved from a government database; and
        a set of guidelines that at least two arbitrators associated with the at least two arbitrator accounts need to follow while performing arbitration of the disputed smart contract by:
            a participant in the plurality of participants being allocated zero percent of the smart contract fund as a penalization in response to the participant being determined, by the at least two arbitrators, via an indication from a machine learning algorithm, to have violated a law of a country that the participant is a resident of; and
            the plurality of participants being allocated zero percent of the smart contract fund in response to the disputed smart contract being determined, by the at least two arbitrators, via the indication from the machine learning algorithm, relating to an illegal activity.

2. The method of claim 1, wherein the smart contract data includes at least one of a contract data and a dispute data, wherein the contract data comprises one or more terms of the disputed smart contract, identification data related to the one or more participants, wherein the dispute data comprises one or more unenforced terms of the disputed smart contract by one or more participants of the plurality of participants.

3. The method of claim 1, wherein each participant in the plurality of participants contributes a predetermined amount to the security deposit fund at the time of institution of the disputed smart contract.

4. The method of claim 1, wherein the smart contract data includes a predetermined number of the arbitrator accounts required to arbitrate the disputed smart contract, wherein acceptance is received from the at least two arbitrator devices based on the predetermined number of the arbitrator accounts.

5. The method of claim 1, wherein the arbitration result comprises a percentage share of the security deposit corresponding to the plurality of participants, wherein the allocating comprises distributing the security deposit fund amongst the plurality of participants based on an average of the percentage share of the security deposit as assigned by the at least two arbitrator accounts.

6. The method of claim 1 further comprising:
evaluating, using the processing device, the arbitration result to determine collusion between the at least two arbitrator accounts;
imposing, using the processing device, a penalty on the at least two arbitrator accounts based on the evaluating.

7. The method of claim 1 wherein the transmitting further comprising:
inspecting, using the processing device, the smart contract data; and
determining, using the processing device, the plurality of arbitrator accounts from predetermined tiers of arbitrator accounts based on the inspecting.

8. A system to facilitate gamified arbitration of disputed smart contracts, the system comprising:
a communication device; and
a processing device;
the system being configured for:
receiving, using the communication device, a smart contract data associated with a disputed smart contract from distributed ledger system, wherein the smart contract data comprises at least one of an arbitration clause and information about a plurality of participants of the disputed smart contract and an associated security deposit data, and the associated security deposit data comprises information about a plurality of security deposits received from the plurality of participants to create a security deposit fund;
transmitting, using the communication device, an arbitration request to a plurality of arbitrator devices to arbitrate the disputed smart contract;
receiving, using the communication device, an acceptance of the arbitration request from at least two arbitrator devices in the plurality of arbitrator devices;
receiving an arbitration stake from at least two arbitrator accounts associated with the at least two arbitrator devices, wherein the arbitration stake is added to the security deposit fund;
anonymizing, using the processing device, the smart contract data to generate an anonymized smart contract data by removing identification details from the smart contract data;
transmitting, using the communication device, the anonymized smart contract data to the at least two arbitrator devices;
receiving, using the communication device, an arbitration result from the at least two arbitrator devices;
allocating, using the processing device, a smart contract fund associated with the disputed smart contract amongst the plurality of participants based on the arbitration result, wherein the smart contract fund comprises a value of the disputed smart contract;
allocating, using the processing device, the security deposit fund amongst the at least two arbitrator accounts in a plurality of arbitrator accounts corresponding to the at least two arbitrator devices based on the arbitration result;
transmitting, using the communication device, at least one rule to the at least two arbitrator devices for arbitration of the disputed smart contract;
analyzing, using the processing device, the arbitration result;
assigning, using the communication device, a rating to each of the at least two arbitrator accounts corresponding to the at least two arbitrator devices based on the analyzing of the arbitration result; and
transmitting, using the communication device, the assigned rating to each of the at least two arbitrator devices;
wherein the at least one rule comprises:
a government policy retrieved from a government database; and
a set of guidelines that at least two arbitrators associated with the at least two arbitrator accounts need to follow while performing arbitration of the disputed smart contract by:
a participant in the plurality of participants being allocated zero percent of the smart contract fund as a penalization in response to the participant being determined, by the at least two arbitrators, via an indication from a machine learning algorithm, to have violated a law of a country that the participant is a resident of; and
the plurality of participants being allocated zero percent of the smart contract fund in response to the disputed smart contract being determined, by the at least two arbitrators, via the indication from the machine learning algorithm, relating to an illegal activity.

9. The system of claim 8, wherein the smart contract data includes at least one of a contract data and a dispute data, wherein the contract data comprises one or more terms of the disputed smart contract, identification data related to the one or more participants, wherein the dispute data comprises one or more unenforced terms of the disputed smart contract by one or more participants of the plurality of participants.

10. The system of claim 8, wherein each participant in the plurality of participants contributes a predetermined amount to the security deposit fund at the time of institution of the disputed smart contract.

11. The system of claim 8, wherein the smart contract data includes a predetermined number of the arbitrator accounts required to arbitrate the disputed smart contract, wherein the acceptance is received from the at least two arbitrator devices based on the predetermined number of the arbitrator accounts.

12. The system of claim 8, wherein the arbitration result comprises a percentage share of the security deposit corresponding to the plurality of participants, wherein the allocating comprises distributing the security deposit fund amongst the plurality of participants based on an average of the percentage share of the security deposit as assigned by the at least two arbitrator accounts.

13. The system of claim 8, wherein the processing device is further configured for:
evaluating the arbitration result to determine collusion between the at least two arbitrator accounts;
imposing a penalty on the at least two arbitrator accounts based on the evaluating.

14. The system of claim 8, wherein the processing device is further configured for:
inspecting the smart contract data; and
determining the plurality of arbitrator accounts from predetermined tiers of arbitrator accounts based on the inspecting.

* * * * *